United States Patent

[11] 3,613,047

[72] Inventors Jury Grigorievich Kron
ulitsa Mira, 324 A, kv. 4;
Vyacheslav Nikolaevich Solovtsov, proezd
Bratsky, 7, kv. 7; **Viktor Vasilievich
Rodoman,** ulitsa Mira, 463, kv. 68, all of
Stavropol, U.S.S.R.
[21] Appl. No. 867,684
[22] Filed Oct. 20, 1969
[45] Patented Oct. 12, 1971
[32] Priority Oct. 18, 1968
[33] U.S.S.R.
[31] 1273751

[54] PLUG-AND-SOCKET CONNECTOR
4 Claims, 4 Drawing Figs.
[52] U.S. Cl. .................................................. 339/89 R
[51] Int. Cl. ........................................................ H01r 13/54
[50] Field of Search .......................................... 339/89–91;
285/81, 82, 85, 86, 91, 93; 151/9, 13, 40, 41

[56] References Cited
UNITED STATES PATENTS
| | | | |
|---|---|---|---|
| 3,393,927 | 7/1968 | Kelly et al. | 285/23 |
| 3,462,727 | 8/1969 | Blight et al. | 339/89 M |

FOREIGN PATENTS
| | | | |
|---|---|---|---|
| 857,344 | 12/1960 | Great Britain | 339/90 |

*Primary Examiner*—Joseph H. McGlynn
*Attorney*—Waters, Roditi, Schwartz & Nissen

ABSTRACT: A plug-and-socket connector for connecting two lengths e.g. two lengths of an electric cable, particularly, under adverse operation conditions (i.e. when the connection is acted upon by dust, mud, water, vibrations, jogging, impacts, etc.), comprising a male plug member, a female receptacle member and a coupling and locking assembly mounted, preferably, on the body of said male plug member, this coupling and locking assembly including an external nut and two rings received internally of said external nut and extending about the body of the male plug member; the herein disclosed plug-and-socket connector features a dependable and comparatively simple structure of its coupling and locking assembly; the main parts of this plug-and-socket connector may be made of a strong plastic material.

PLUG-AND-SOCKET CONNECTOR

The present invention relates to plug-and-socket connectors adapted to connect lengths of electric cable, particularly under adverse operating conditions (when the connection may be subjected to the action of dust, mud, water, jogging, vibrations, impacts, etc.).

Known in the art is a plug-and-socket connector which comprises a female receptacle member, a male plug member and a coupling and locking assembly mounted on the body of the male plug member, this coupling and locking assembly including a sleeve nut, a pair of rings extending coaxially about the body of the male plug member, one of the two rings being engageable with the sleeve nut, and a ball retainer preventing any unwanted self-unscrewing of the sleeve nut.

In this known plug-and-socket connector, the coupling and locking assembly is of a comparatively complicated structure; moreover, this known connector is used for connection of electric cables under stationary conditions with the female receptacle member thereof being secured to a mounting panel so that the ball retainer of the coupling and locking assembly should always be at the top of the connector, least the retaining ball might fall out and get lost, when the male plug member is either being connected with the female receptacle member or disconnected therefrom.

Therefore, this known plug-and-socket connector can not safely be used under field conditions for connecting two lengths of an electric cable, without the female receptacle member of the connector being secured to some type of a mounting panel, for the ball retainer to be positively and always at the top of the connector; otherwise, should the female receptacle member be not positively positioned, as described hereinabove, the operators of the connector would have to position properly the connector prior to every coupling or uncoupling operation. Besides, should any dirt, mud, dust, etc. find its way into the coupling and locking assembly of this known connector under field conditions, this might lead to jamming of either the coupling and locking assembly, or of the connector as a whole.

It is an object of the present invention to eliminate the above mentioned disadvantages.

A further object of the present invention is to provide a plug-and-socket connector which has a coupling and locking assembly of a simple structure and which is characterized by dependable operation and which positively provides for performing connecting and disconnecting operations in any spatial position of the connector thus simplifying the task of the operators.

This object is accomplished in a plug-and-socket connector comprising a female receptacle member, a male plug member and a coupling and locking assembly mounted on either said male plug member or said female receptacle member, preferably on the body of said male plug member, said coupling and locking assembly including a sleeve nut and a pair of rings extending about the body of said male plug member, the first of said rings being engageable with said sleeve nut, in which connector, in accordance with the present invention, said first ring engageable with said sleeve nut is spring-biased for limited axial reciprocation relative to said sleeve nut and for rotation jointly therewith about said body of said male plug member, the second of said two rings being fixedly engageable with said body of said male plug member under the action of the springs biasing said first ring; one of said first and second rings having lugs on one end face thereof; the lugs being adapted to engage in the respective extreme screwed on and unscrewed positions of said sleeve nut the corresponding recesses provided on that end face of the other one of said first and second rings, which engages in operation said one end face of said one of said first and second rings.

It is expedient to provide said first ring, engageable with said sleeve nut, with axial projections adapted to engage by the respective side edges thereof a plurality of corresponding axial projections of an annular shoulder provided on the internal surface of said sleeve nut, said springs biasing said first ring for axial reciprocation relative to said sleeve nut and bringing it against said second ring fixedly engageable with said body of said male plug member, said springs being received in the spaces between the adjacent pairs of said projections.

A plug-and-socket connector, designed in accordance with the present invention, has been found to achieve the above objects and aims, and thus can be widely and successfully used under a wide variety of climatic and atmospheric conditions (under high and low temperatures, in water, in dust-ridden air, in mud, etc.); besides, its relatively simple structure makes it possible to manufacture every constituent part of the herein disclosed plug-and-socket connector from mechanically strong plastic materials.

The present invention will be better understood from the following detailed description of a preferred embodiment of the invention, with due reference being made to the accompanying drawings, wherein.

Figure 1:
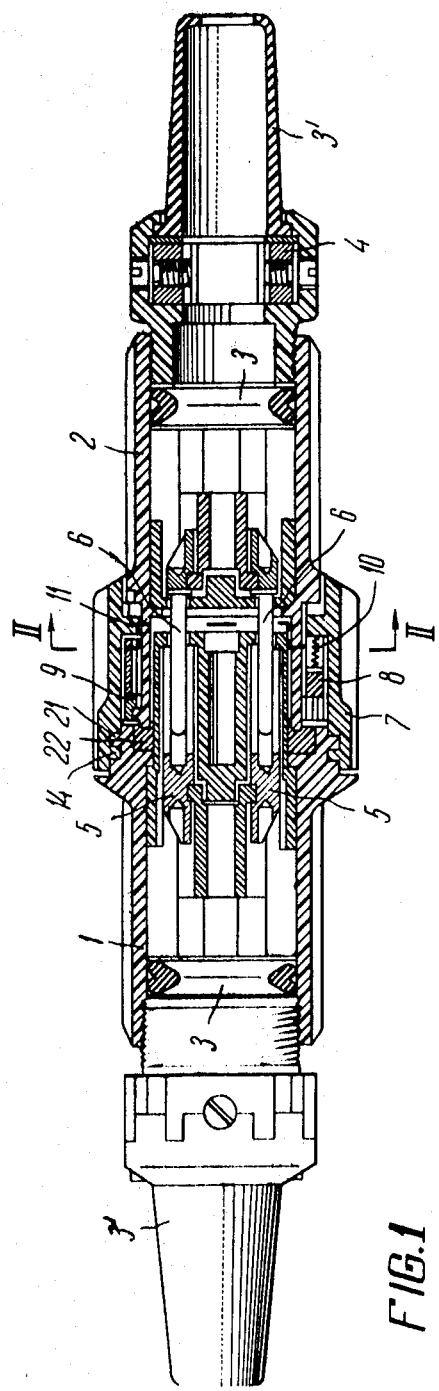
FIG. 1 is an axial sectional view of a plug-and-socket connector, embodying the invention.
Figure 2:
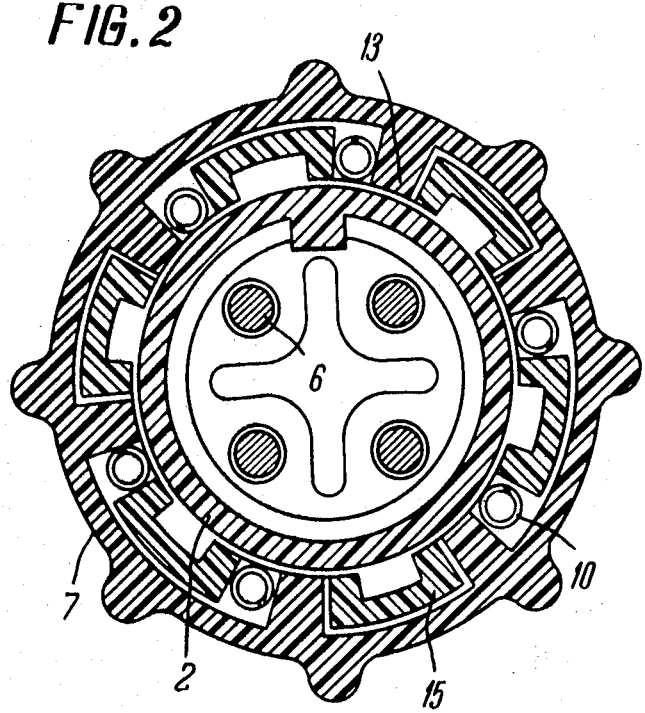
FIG. 2 is a cross-sectional view of the connector, illustrated in FIG. 1, taken along line II—II of FIG. 1.

Referring now in particular to the appended drawings, it can be seen from FIGS. 1 and 2 that a plug-and-socket connector embodying the invention comprises a female receptacle member 1 and a male plug member 2 with their respective plastic bodies. Each one of said bodies receives thereinside the respective sealing members 3 and 3′ for sealingly engaging the end portion of an associated electric cable, as well as members 4 for securing this end portion of the electric cable. Mounted inside the body of the female receptacle member 1 are insulating means supporting socket contact members 5, while insulating means mounted inside the body of the male plug member 2 support contact pins 6. Mounted on either one of the two bodies of the herein disclosed connector, adjacent to the engagement end thereof, is a coupling and locking assembly (in the embodiment now being described this coupling and locking assembly is mounted on the body of the male plug member 2) including a sleeve nut 7 receiving thereinside a pair of rings 8 and 9 extending coaxially about the body of the male plug member 2, and a plurality of compression springs 10. The ring 8 is directly engaged by the sleeve nut 7, the ring being mounted inside said sleeve nut for limited axial reciprocation relative to the nut 7 and for rotation jointly with said sleeve nut in relation to the body of the male plug member 2, while the ring 9 is fixedly supported by the body of the male plug member 2, the springs 10 being compressed in operation between the ring 8 and the nut 7, the compression force of these springs acting through the ring 8 on the ring 9, engaging it with the body of the male plug member 2.

Figure 3:
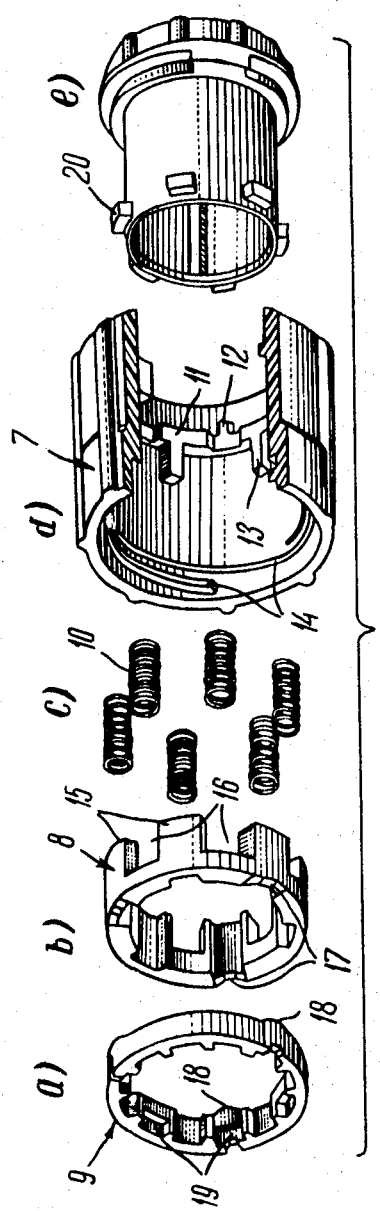
FIG. 3 (*a*, *b*, *c*, *d*, *e*) is an exploded view of the coupling and locking assembly of the plug-and-socket connector, according to the invention, together with a portion of the body of the male plug member.

For this embodiment of the present invention to be better understood, shown in FIG. 3 is an exploded view of the coupling and locking assembly (positions *a, b, c, d, e*), together with the body of the male plug member 2, from which it can be seen that the nut 7 (FIG. 3*d*) is provided with an annular radially projecting shoulder 11 on the internal side thereof, this shoulder including on one side thereof axial projections 12 adapted to limit rotation of the nut 7 relative to the body of the male plug member 2, while on the opposite side thereof this shoulder has axial lugs 13 acting as guideways for axial reciprocation of the ring 8 inside the nut 7. Besides, the nut 7 is provided with a multiple helical thread 14 on the internal side thereof. The ring 8 has axially extending guiding projections 15 (FIG. 3*b*), alternating with sockets 16 adapted to receive the end portions of the springs 10 (FIG. 3*c*), the opposite end face of the ring 8, adapted to engage the ring 9 in the assembled state of the coupling and locking assembly, is provided with retaining recesses 17. One end face of the ring 9

(FIG. 3a) is provided with lugs 18 which, in the corresponding angular positions of the nut 7, are received in the retaining recesses 17 of the ring 8, whereby the external nut 7 is retained in the extreme operational positions thereof; the other face end of the ring 9 has undercut recesses 19 adapted to engage the corresponding ones of the radial lugs 20 (FIG. 3e) made integral with the body of the male plug member 2.

The above described coupling and locking assembly is assembled in the following manner.

The sleeve nut 7 is first assembled with the nut 8, the ring 8 being introduced into the nut 7 for the projections 15 to engage by their respective sides the corresponding ones of the axial lugs 13 of the internal radial annular shoulder 11 of the nut 7; the respective end portions of the springs 10 are then mounted in the sockets 16 of the ring 8 whereafter the nut 7 with the above-mentioned members is slid onto the body of the male plug member 2 and is retained thereupon by the ring 9 thereat, the retaining being effected by pressing the ring 9 which is moved below the lugs 20, whereafter the ring 9 is rotated for the lugs 20 to be snugly received inside the corresponding undercut recesses 19 of the ring, whereby the ring 9 is finally fixed on the body of the male plug member 2 and retains thereupon the whole coupling and locking assembly in its assembled state.

Figure 4:
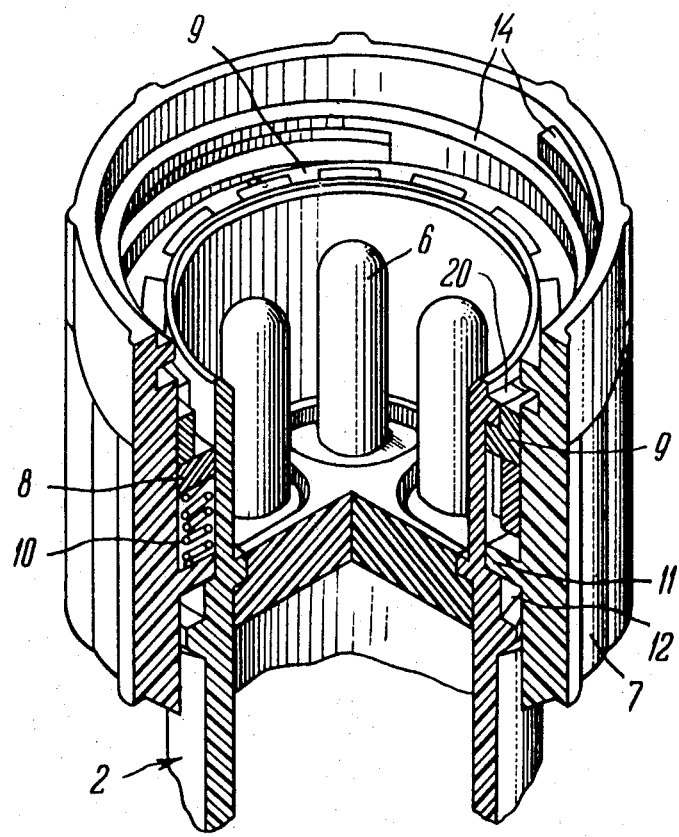
FIG. 4 is a perspective view of the coupling and locking assembly.

Shown in FIG. 4 is a perspective view of the coupling and locking assembly applied onto the male plug member 2. The external surface of the body of the female receptacle member 1 is also provided with a multiple helical thread 21 (FIG. 1) engageable with the multiple helical thread 14 of the sleeve nut 7, while the end face of the body of the female receptacle member 1 has an annular groove cut therein, this groove being adapted to receive a sealing gasket 22 made of an elastically deformable material, this gasket sealing away the area of the contact of the end faces of the male plug member and the female receptacle member 1 in the coupled position of the herein disclosed plug-and-socket connector.

To couple the male plug member 2 with the female receptacle member 1, the former is pushed into the female receptacle member 1, till the end face of the body of the male plug member 2 engages the sealing gasket 22, whereafter the sleeve nut 7 is screwed onto the body of the female receptacle member 1.

While the nut 7 is being screwed onto the body of the female receptacle member 1, the ring 8 is rotating together with the sleeve nut, whereby the recesses 17 of the ring 8 disengage themselves from the lugs 18 of the ring 9 which means that the ring 8 compresses somewhat further the springs 10 and moves toward the annular shoulder 11 of the nut 7 through the axial extent of the lugs 18.

The nut 7 is rotated further on with the ring 8 in the last-described position, until the lugs 18 of the ring 9 meet again the recesses 17 of the ring 8 (the lugs and the recesses being uniformly spaced about the peripheries of their respective rings) and are engaged therein. This engagement is accompanied by a specific "snapping" sound which corresponds to a "locked" position of the connector. In this position the female receptacle member 1 and the male plug member 2 are firmly and reliably locked together.

The nut 7 may be now rotated in the opposite, unscrewing direction, until another snapping sound is heard, which means that the coupling assembly is unlocked; in this "free" position the female receptacle member 1 and the male plug member 2 can be easily disengaged.

When the female receptacle member 1 and the male plug member 2 are engaged, and the coupling assembly is in its locked position, the springs 10 are compressed and exert their compression force through the rings 8 and 9 upon the body of the male plug member 2, pressing it constantly against the sealing gasket 22 of the female receptacle member 1, whereby any wearing away or residual deformation of the gasket 22 is compensated for, and positive sealing away of the electric connection is ensured.

We claim:

1. A plug-and-socket connector including a female receptacle member; a male plug member, each of said members including a body, and a coupling and locking assembly mounted movably on one of said bodies and comprising a sleeve nut including a circular shoulder and longitudinal lugs positioned on the inside thereof and multiple thread turns extending into connection with a helical thread included by the other of said bodies for locking said female receptacle member and said male plug member in a coupled position; a first ring located inside said sleeve nut and surrounding said body of the male plug member, said ring being movably mounted for limited axial biasing relative to said sleeve nut and for rotation therewith about said body of the male plug member; a second ring located inside said sleeve nut and surrounding said body of the male plug member, said second ring being immovably mounted on said body of the male plug member, and spring means for axially biasing said first ring in the direction of said second ring mounted on said body of the male plug member.

2. A plug-and-socket connector according to claim 1, wherein said first ring is provided with recesses on the end side adjacent said second ring, said second ring including projections corresponding to said recesses on the end side adjacent to said first ring, said recesses receiving said projections when said sleeve nut is fully screwed in or out with respect to said body of the male plug member.

3. A plug-and-socket connector including a female receptacle member; a male plug member, each of said members including a body, and a coupling and locking assembly mounted movably on the body of said male plug member and comprising a sleeve nut including a circular shoulder and longitudinal lugs positioned on the insider thereof and multiple thread turns extending into connection with a helical thread included on said body of the female receptacle member for locking said female receptacle member and said male plug member in a coupled position; a first ring and a second ring located inside said sleeve nut and surrounding said body of the male plug member, and spring means for axially biasing said first ring in the direction of said second ring, said first ring having longitudinal projections for interconnection with said sleeve nut, said projections engaging respective longitudinal recesses provided in said circular shoulder inside said sleeve nut and forming sockets for the accommodation of said spring means for causing reciprocation of said first ring with respect to said sleeve nut.

4. A plug-and-socket connector including a female receptacle member; a male plug member, each of said members including a body, and a coupling and locking assembly mounted movably on the body of said male plug member and comprising a sleeve nut including a circular shoulder and longitudinal lugs positioned on the inside thereof and multiple thread turns extending into connection with a helical thread included on the body of said female receptacle member for locking said female receptacle member and said male plug member in a coupled position; spring means; a first ring and a second ring located inside said sleeve nut and surrounding the body of said male plug member, said body including radial lugs for securely fixing said second ring, and holding said coupling and locking assembly on the body of said male plug member; said second ring being provided with recesses on its end side, corresponding to said radial lugs on said body of the male plug member, said lugs engaging said recesses on said end side of the second ring.